Nov. 24, 1970     R. PISORS     3,541,847
FLUID FLOW ANALYZING METHOD AND APPARATUS
Filed June 7, 1968
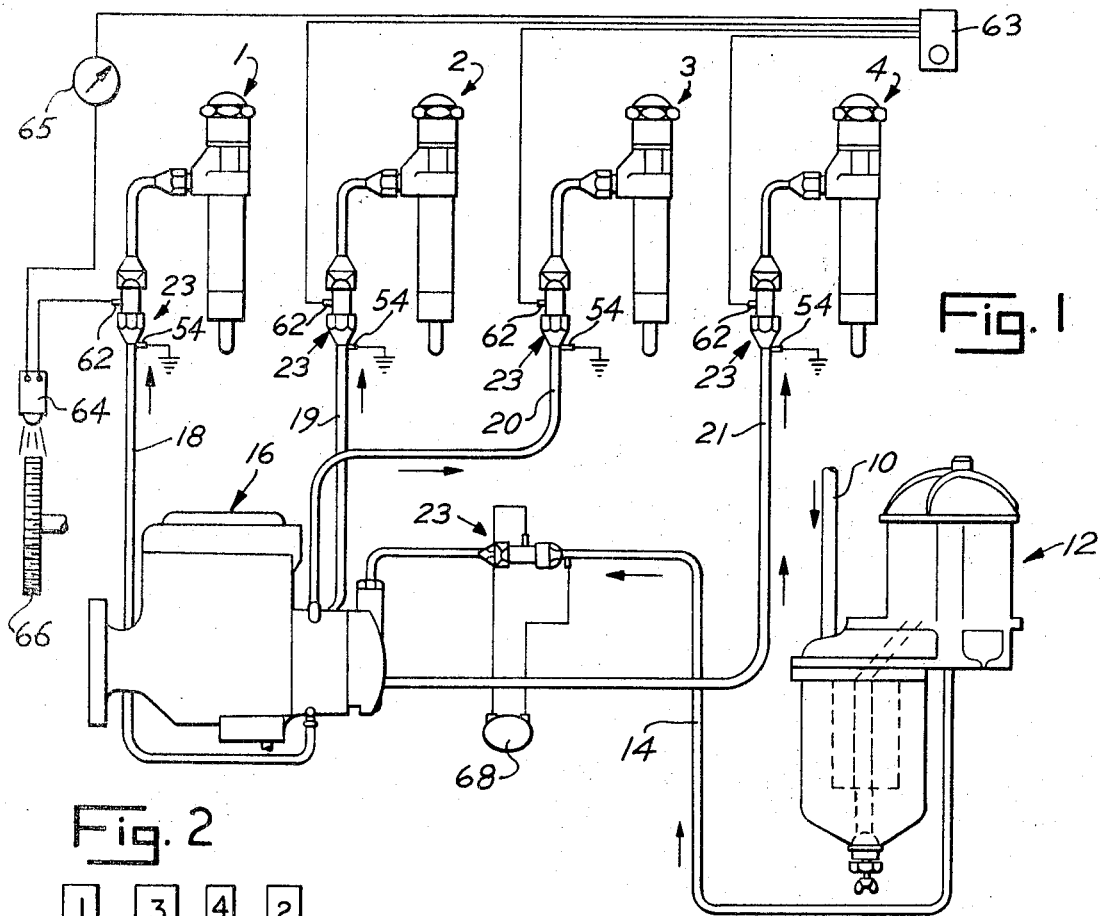
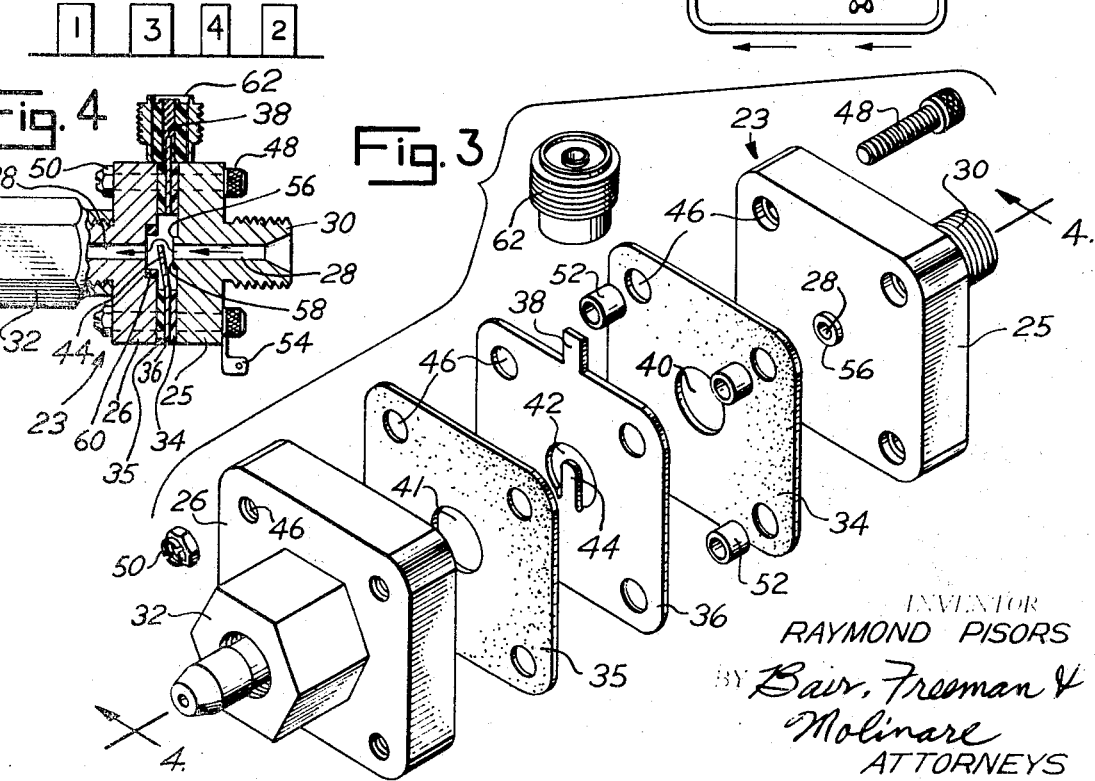
INVENTOR
RAYMOND PISORS
by Bair, Freeman & Molinare
ATTORNEYS

United States Patent Office 3,541,847
Patented Nov. 24, 1970

3,541,847
FLUID FLOW ANALYZING METHOD AND APPARATUS
Raymond Pisors, Morton Grove, Ill., assignor to Sun Electric Corporation, a corporation of Delaware
Filed June 7, 1968, Ser. No. 735,309
Int. Cl. G01m 15/00
U.S. Cl. 73—119          5 Claims

ABSTRACT OF THE DISCLOSURE

A fluid flow analyzing and timing method and apparatus having a transducer disposed in one or more fuel feed lines of a fuel injected engine. The flowing fuel in the feed line passes through the transducer and impinges upon a normally closed resilient movable contact in the switch to open an electrical circuit. A tachometer for measuring the rotational speed of the engine or a timing light for timing the engine may be located in the electrical circuit of one of the transducers. To measure, display and provide for comparison of the time duration of fuel flow through each fuel line, a transducer may be provided in each of the lines and an oscilloscope is connected across the electrical circuits of the switches to display the signals generated by the opening and closing of the transducers.

BACKGROUND OF THE INVENTION

This invention relates to a fluid flow analyzing method and apparatus and, more particularly, to a new and improved method and apparatus for measuring pulsating fuel flow characteristics in a fuel injector system for timing purposes or the like.

At this time no satisfactory electronic systems or methods have been devised to analyze and pinpoint fuel injector system malfunctions for fuel injected internal combustion engines, such as diesel engines or to accurately time such engines particularly during high speed operation. Such fuel systems, at present, are therefore difficult to service and adjust and, at best, the prior methods and apparatus utilized for detecting malfunctions or for timing the engines have been crude and time consuming and do not produce accurate results. One such prior timing method and arrangement employs a sensing switch which is clamped around a flexible hose in the fuel line, the hose expanding and contracting in response to the fuel flow to operate the switch. Such indirect method and arrangement is, at best, only capable of coarse timing at low engine speeds and is ineffective at higher engine operating speeds. If poor timing and erratic injector nozzle operation at normal or high engine operating speeds go undetected, poor engine performance results as well as increased fuel consumption and undesirable atmospheric pollution due to the resulting inefficient combustion of the fuel.

When the electronic method and apparatus of my invention are employed, the abovenoted disadvantages are overcome. My invention may be easily and rapidly installed in present fuel injector systems without extensive modification of the injector systems and is capable of use while the engine is operating at normal, as well as, high speeds. Where the transducer or trigger switch of my invention is incorporated in a plurality of fuel feed lines, the time duration of fuel flow through each injector nozzle can be rapidly determined and displayed electronically and a prompt comparison of the fuel flow through the nozzles and various other points in the system is rendered possible. Any malfunctions in the fuel system will be rapidly ascertained and pinpointed enabling rapid correction of the malfunctions. Moreover, a single transducer or trigger switch of my invention, may be used at either high or low engine speeds to trigger a timing device, a tachometer or other electronic device that would be used either as a part of the engine testing apparatus or the engine itself where it is desired to know the speed of the engine or where it is desired to time the engine. Finally, the apparatus constructed in accordance with the principles of my invention is simple in construction and reliable in operation, and the method and apparatus of my invention may be readily employed by relatively unskilled technicians and personnel without a sacrifice of either effectiveness or reliability.

SUMMARY OF THE INVENTION

In a principal aspect, the fluid is flowed through a fluid system and a transducer or trigger switch is located in fluid flow relationship in the system. The fluid flowing through the transducer strikes a movable electrical contact surface disposed in the fluid flow and moves the contact surface from a first position to generate a first electrical signal to a second position to generate a second electrical signal. The contact surface of the transducer is located in an electrical circuit and the signals so generated pass through the circuit to a sensing means which displays the position of the contact surface and, in turn, certain characteristics of the fluid flow.

These and other objects, features and advantages of the present invention will be more clearly understood through a consideration of the following detailed description.

BRIEF DESCRIPTION OF THE DRAWING

In the course of this description, reference will frequently be made to the attached drawings in which:

FIG. 1 is a schematic view of a fuel injector system incorporating an embodiment of the fluid flow analyzing apparatus of my invention;

FIG. 2 is an example of an oscilloscope presentation displaying the fuel flow characteristics of the system shown in FIG. 1;

FIG. 3 is an enlarged exploded view of the preferred embodiment of a fluid flow transducer of the present invention; and FIG. 4 is a cross-sectioned elevation view of the transducer in assembled form, taken along line 4—4 of FIG. 3.

DESCRIPTION OF THE PREFERRED EMBODIMENT

Referring to FIG. 1, a typical diesel fuel injection system is shown. A plurality of fuel injector nozzles 1, 2, 3 and 4 are provided which are arranged in the like numbered cylinders (not shown) of a diesel engine. A fuel line 10 feeds fuel oil from an appropriate fuel storage tank (not shown) to a suitable fuel filter arrangement 12. A fuel line 14 conducts the fuel from the filter arrangement 12 to an injector pump 16. The injector pump 16 pressurizes the fuel and passes the fuel selectively and in sequentially timed pulses to each of the fuel injector nozzles 1, 2, 3 and 4 through nozzle feed lines 18, 19, 20 and 21, respectively. Frequently, the engine will become poorly timed, or due to wear and extended use, the injector nozzles 1, 2, 3 and 4 or the injector pump 16 will malfunction and the quantity and time duration of fuel injected into the appropriate cylinders will become erratic and poor performance of the engine results.

In order to correct these problems, a fuel flow transducer or trigger switch 23 is located in fuel flow relationship in one or more of the nozzle feed lines 18, 19, 20 and 21. Referring particularly to FIGS. 3 and 4, the flow transducer 23 includes a pair of electrically conductive plates 25 and 26, each having a bored fuel flow passage 28 therethrough. Plate 25 carries an appropriate inlet connection 30 and plate 26 carries an outlet connection 32 in communication with their fuel flow pasages 28. The inlet and outlet connections may be threaded to receive suitable coupling bushings for connection of each of the transducers 23 to its nozzle feed line. Sandwiched between the plates 25 and 26 are a pair of non-conductive gaskets 34 and 35 and located between the gaskets is a relatively thin conductive contact plate 36. The contact plate 36 includes a terminal tab 38 extending outwardly from its periphery. The gaskets 34 and 35 and the contact plate 36 are each provided with a centrally located aperture 40, 41 and 42, respectively, each of the apertures being positioned to align with each other and with the flow passages 28 of plates 25 and 26 when the transducer is assembled. The center aperture 42 of the contact plate 36 includes a resilient movable contact surface 44 extending toward the center of the aperture and formed integrally in one piece construction with the contact plate 36. The movable contact surface 44 is of such length that it extends across the flow passage 28 of plate 25 when the transducer is assembled. If the volume of flow is extremely high, a small hole may be provided in the contact surface 44 in alignment with flow passage 28 of plate 25 to relieve high back pressures. Each of the plates 25 and 26, gaskets 34 and 35, and contact plate 36 include a plurality of holes 46 about their circumference which are adapted to align with each other to receive bolts 48 having nuts 50 to hold the assembly together in close sandwiched relationship. The nuts 50 may be eliminated if desired by threading the bolts 48 directly into the holes 46 of plate 26. A suitable non-conductive sleeve 52 is journaled through the holes 46 to prevent conductive contact of the plates and the bolts 48. As shown in FIG. 4, one of the bolts 48 carries an electrical ground terminal 54 which is pressed between the head of the bolt 48 and the external face of plate 25 in electrical contacting relationship to the plate. It will be evident that other suitable methods of grounding plate 25 may be employed, if desired. The fuel flow passage 28 of plate 25 terminates in a slightly raised shoulder 56 which carries a stationary electrical contact surface 58 at its end. The shoulder extends into the aperture 40 of gasket 34 through substantially the thickness of that gasket, the contact surface 58 lying substantially in the plane of contact plate 36. An insulating ring 60 may be provided on the inner face of plate 26 to prevent conductive contact of the resilient movable contact finger 44 with plate 26 and also to limit the travel of the contact finger when fuel is flowing through the fuel flow passages 28. An appropriate terminal connector 62 is provided on terminal 38 to facilitate the connection of the flow transducer in its electrical circuit will be described in detail hereinafter.

One or more of the fuel flow transducers 23 are connected in circuit with an appropriate signal display device. For example as shown in FIG. 1, each of the flow transducers 23 is connected to an oscilloscope 63 of an engine performance analyzer. Although an oscilloscope is shown, it should be readily understood that any suitable display device may be utilized to display the signals produced by the transducers. One of the flow transducers 23 may also be connected to a suitable strobe timing light 64 or to a tachometer 65 where it is desired to sense the rotation of the engine. A single flow transducer thus may be utilized for timing the engine by selectively energizing the conventional strobe timing light 64 to illuminate appropriate timing marks on the fly wheel 66 of the engine. Moreover, a flow transducer 23 may be located in the inlet fuel line 14 of the injector pump 16 to indicate the condition of the injector pump. The electrical signals produced by the latter flow transducer may either be connected to a separate indicator 68 or may be connected in circuit with the oscilloscope 63 to provide for the display of information desired.

As a typical example, the signal display on the oscilloscope as generated by the flow transducers 23, is shown in FIG. 2. Each of the presentations 1, 3, 4 and 2 correspond to the firing order of each of the nozzles 1, 2, 3 and 4. The width of each presentation is proportional to the time duration of fuel flow to each of the respective nozzles. It will be noted that the width of each of the presentations shown in FIG. 2 differ from each other, indicating a malfunction of the fuel injector system and a need for the adjustment of the system. Since each of the presentations corresponds with one of the fuel injector nozzles, a malfunction is rapidly pinpointed making possible rapid and effective correction of the malfunction.

When considering the above detailed description of the preferred embodiment of my invention, its operation should should be readily apparent. However, for the purpose of clarity, a detailed description of operation follows.

When the engine is running, fuel flows from the fuel storage tank (not shown), through fuel line 10, through the fuel filter arrangement 12 and through fuel line 14 to the fuel injector pump 16. The fuel injector pump 16, selectively and in sequentially timed pulses, pumps the fuel through nozzle feed lines 18, 19, 20 and 21 to each of the fuel injector nozzles 1, 2, 3 and 4, respectively. As the fuel passes through nozzle feed lines, the fuel enters the inlet connection 30 of plate 25 of each of the flow transducers 23, passing through the fuel flow passage 28 of plate 25, and moving the resilient movable contact surface 44 to the left, as viewed in FIG. 4, due to the force of the impinging fuel upon the contact surface. The fuel then continues through the fuel flow passage 28 in plate 26 and on to the fuel injector nozzle. Prior to the passage of fuel through the flow passage 28 of plate 25, the resilient movable contact surface 44 is undeformed and contacts the stationary contact surface 58 of plate 25. Electrical current flow is thereby established through the terminal connector 62, the terminal tab 38, the contact plate 36, the resilient movable contact surface 44, the stationary contact surface 58, the conductive plate 25 and to ground through the terminal 54 and a first signal is sent to the oscilloscope, timing light, etc. The timing light circuit may include an appropriate relay or the like for rendering its illumination properly responsive to the signal. When a pulse of fuel from the injector pump 16 is delievered to the nozzle feed line in which the transducer is located, the flowing fuel enters the flow passage 28 of plate 25 and impinges upon the face of the resilient movable contact surface 44 deflecting the movable contact surface to the left, as viewed in FIG. 4, and out of electrical contact with the stationary contact surface 58. Thus, the electrical circuit is opened, and a second no-current-flow signal is transmitted to the oscilloscope, timing light, etc. Thus, the time duration of each pulse of fuel flow passing through each nozzle 1, 2, 3 and 4 is displayed upon the oscilloscope 63 and each of the time durations may be compared and readily adjusted, as necessary, to correct malfunctions. Also since the frequency of the fuel pulses is directly proportional to the rotating speed of the engine, each signal produced by transducer 23 in fuel line 18 may be utilized to operate the timing light 64 and/or tachometer 65. As mentioned previously a flow transduced 23 may also be installed in the inlet fuel line 14 to obtain information resulting from the pulsation of the fuel flow to the injector pump 16. The latter information may be displayed either on separate indicator 68 or on the oscilloscope 63 to indicate the condition of the injector pump 16.

Although I have described the preferred embodiment of my invention primarily with reference to the fuel injector system of a four cylinder diesel engine, it will be readily apparent that the principles of my invention may be employed to equal advantage in injector systems of other engines and engines using other fuels as well as numerous other fluid flow systems where it is desired to analyze the fluid flow characteristics of a pulsating fluid. It should also be understood that the embodiment of the invention which has been described is merely illustrative of an application of the principles of the invention. Numerous modifica-

I claim:

1. A method of analyzing the pulsating fluid flow characteristics of a pulsating fuel stream, comprising the steps of:
    passing said pulsating fuel stream into direct contact with a pair of electrical contacts,
    generating a first electrical signal by closing said pair of electrical contacts to complete an electrical circuit through said contacts in response to the absence of one of said fuel pulses,
    generating a second electrical signal in response to the presence of each one of said pulses by directly impinging said pulse of fuel upon one of said pair of contacts to open said contacts, said first and second signals alternating in response to the presence and absence of said pulses, and
    sensing said first and second alternating signals to determine the characteristics of said pulsating fuel stream.

2. The method of claim 1 wherein said pulsating fuel is liquid fuel passing between an injector pump and a fuel injector nozzle.

3. The method of claim 1 wherein said first and second alternating signals are substantially equal in time duration respectively to the time lapse between said pulses and the time duration of said pulses, and the frequency of said alternating signals is substantially equal to the frequency of said pulses.

4. A system for analyzing the pulsating fuel flow characteristirs of a fuel injection system comprising:
    a plurality of fuel injection nozzles,
    means for pumping selectively and sequentially timed pulses of fuel under pressure to each of said nozzles,
    a pair of electrical contacts disposed between at least one of said nozzles and said pumping means and in direct contact with the fuel being pumped to said nozzle, one of said contacts being movable to a first position in response to the absence of one of said timed pulses and to a second position in response to the direct impingement of one of said timed pulses of fuel on said one contact to open and close said contacts,
    electrical circuit means including said pair of contacts, the opening and closing of said contacts generating alternating electrical signals in said circuit means, and
    means for sensing said signals to determine the characteristics of said pulsating fuel flow.

5. The system of claim 4 wherein said sensing means includes means for determining at least one of the frequency and time duration of said pulses and the time lapse between said pulses.

References Cited

UNITED STATES PATENTS

| | | | |
|---|---|---|---|
| 384,570 | 6/1888 | Grovesteen et al. | 116—117 |
| 1,574,460 | 2/1929 | Williamson | 116—117 |
| 2,691,888 | 10/1954 | Daulby. | |
| 2,766,441 | 10/1956 | Whittle | 116—117 X |
| 2,772,409 | 11/1956 | Reid | 200—81.9 X |
| 2,826,754 | 3/1958 | Carignan | 200—81.9 X |
| 3,101,611 | 8/1963 | Traver | 73—117.2 |
| 3,327,526 | 6/1967 | North. | |
| 3,358,499 | 12/1967 | Fourtane. | |

JERRY W. MYRACLE, Primary Examiner

U.S. Cl. X.R.

116—117